(12) United States Patent
Seo et al.

(10) Patent No.: US 11,767,390 B2
(45) Date of Patent: Sep. 26, 2023

(54) UV-CURABLE RESIN COMPOSITION ENABLING THERMOFORMING AND REPLICA FILM OF REAL MATERIAL COMPRISING SAME

(71) Applicants: HYUNDAI MOTOR COMPANY, Seoul (KR); KIA MOTORS CORPORATION, Seoul (KR); SKC HI-TECH & MARKETING CO., LTD., Cheonan-si (KR)

(72) Inventors: Jae Sik Seo, Hwaseong-si (KR); Hyun Jung Kim, Seoul (KR); Hyun Kyung Kwon, Incheon (KR); Seong Do Kim, Suwon-si (KR); Chang Ho Kang, Cheonan-si (KR)

(73) Assignees: HYUNDAI MOTOR COMPANY, Seoul (KR); KIA MOTORS CORPORATION, Seoul (KR); SKC HI-TECH & MARKETING CO., LTD., Cheonan-si (KR)

(*) Notice: Subject to any disclaimer, the term of this patent is extended or adjusted under 35 U.S.C. 154(b) by 381 days.

(21) Appl. No.: 17/036,871

(22) Filed: Sep. 29, 2020

(65) Prior Publication Data
US 2021/0115178 A1 Apr. 22, 2021

(30) Foreign Application Priority Data
Oct. 17, 2019 (KR) .................. 10-2019-0129027

(51) Int. Cl.
*C08F 2/46* (2006.01)
*C08F 2/50* (2006.01)
*C08G 61/04* (2006.01)
*C08F 283/00* (2006.01)
*C08J 5/18* (2006.01)

(52) U.S. Cl.
CPC ............. *C08F 283/006* (2013.01); *C08J 5/18* (2013.01); *C08J 2375/06* (2013.01)

(58) Field of Classification Search
CPC .. C08F 222/102; C08F 283/06; C08F 220/02; C08F 220/281; C09D 151/08; C08J 5/18; C08J 2375/06
USPC ...... 522/18, 12, 7, 6, 71, 1, 189, 184; 520/1
See application file for complete search history.

(56) References Cited

FOREIGN PATENT DOCUMENTS

| CN | 101274500 | * | 10/2008 | |
|---|---|---|---|---|
| KR | 2014-0083593 A | | 7/2014 | |
| KR | 2018-0132374 A | | 12/2018 | |
| WO | WO-2018222002 A1 | * | 12/2018 | ............. B32B 27/08 |
| WO | WO-2021020588 A1 | * | 2/2021 | |

OTHER PUBLICATIONS

Nakayama et al, CN 101274500 Machine Translation, Oct. 1, 2008 (Year: 2008).*
Jo et al, WO 2018/222002 Machine Translation, Dec. 6, 2018 (Year: 2018).*

* cited by examiner

Primary Examiner — Jessica Whiteley
(74) Attorney, Agent, or Firm — MCDONNELL BOEHNEN HULBERT & BERGHOFF LLP

(57) ABSTRACT

The present disclosure relates to a UV-curable resin composition enabling thermoforming and a replica film of a real material including the same, in which the UV-curable resin composition includes a prepolymer including a urethane-based oligomer and an acrylic oligomer, an acrylate monomer and a photoinitiator.

16 Claims, 1 Drawing Sheet

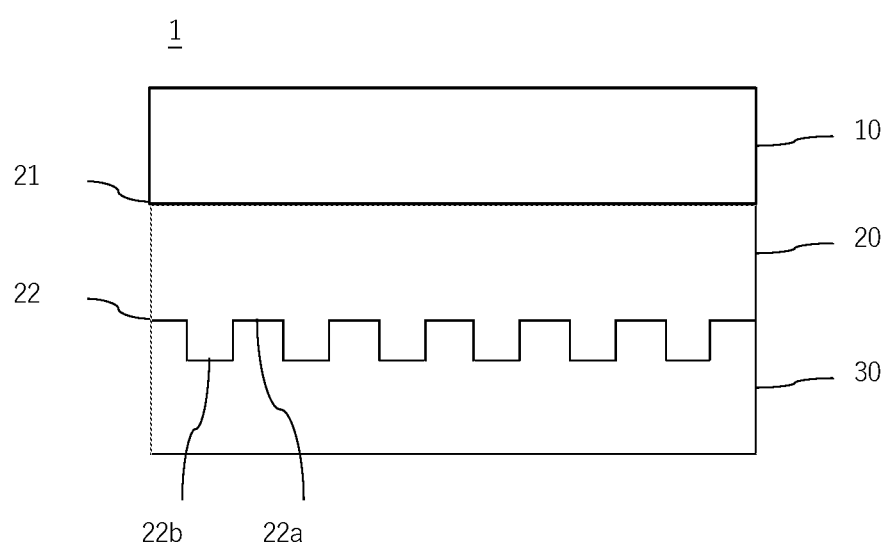

UV-CURABLE RESIN COMPOSITION ENABLING THERMOFORMING AND REPLICA FILM OF REAL MATERIAL COMPRISING SAME

CROSS REFERENCE TO RELATED APPLICATIONS

The present application claims priority based on Korean Patent Application No. 10-2019-0129027, filed on Oct. 17, 2019, the entire content of which is incorporated herein for all purposes by this reference.

BACKGROUND

1. Technical Field

The present disclosure relates to a UV-curable resin composition enabling thermoforming and a replica film of a real material including the same.

2. Description of the Related Art

In order to upgrade the interior and exterior materials for vehicles, especially high-performance vehicles, interior and exterior materials using ultra-high-priced real carbon woven fabrics are being applied. However, real carbon materials are expensive and the processing thereof into parts is complicated.

Hence, various attempts have been made to replicate real carbon in a manner in which a film having a shape similar to the surface pattern of real carbon is subjected to injection molding using a mold and then to surface coating, and is thus applied to parts.

These techniques are advantageous because of cost reduction, but suffer from poor outer appearance. In particular, conventional replication processes cannot implement the line width of real carbon, and have a technical limitation that does not implement the inherent three-dimensional effect and glossiness of carbon.

With the goal of overcoming these problems, attempts have been made to apply UV imprinting techniques, but the properties of a hard UV resin layer cannot shape complex automotive parts that are not flat.

SUMMARY

Accordingly, an objective of the present disclosure is to provide a replica film, which is manufactured by precisely replicating a real material to thus exhibit the inherent properties thereof, and a UV-curable resin composition included therein.

Another objective of the present disclosure is to provide a replica film, which has high formability and may thus be applied to complex automotive parts that are not flat, and a UV-curable resin composition included therein.

The objectives of the present disclosure are not limited to the foregoing, and will be able to be clearly understood through the following description and to be realized by the means described in the claims and combinations thereof.

An aspect of the present disclosure provides a UV-curable resin composition, including a prepolymer including a urethane-based oligomer and an acrylic oligomer, an acrylate monomer, and a photoinitiator.

The urethane-based oligomer and the acrylic oligomer may contain an acrylate end group.

The urethane-based oligomer may include a first urethane-based oligomer obtained by reacting a polymer of a first isocyanate and a polyol with a reactive monomer, and a second urethane-based oligomer obtained by reacting a polymer of a second isocyanate and a polyol with a reactive monomer.

The first urethane-based oligomer may include a bifunctional aliphatic urethane acrylate, and the second urethane-based oligomer may include a trifunctional aliphatic urethane acrylate.

The first isocyanate may be selected from the group consisting of toluene diisocyanate (TDI), naphthalene-1,5-diisocyanate, p-phenylene diisocyanate, toluidine diisocyanate, 4,4'-diphenyl methane diisocyanate, 4,4'-methylene dicyclohexyl diisocyanate, hexamethylene diisocyanate, dicyclohexylmethane diisocyanate, isophorone diisocyanate and combinations thereof.

The second isocyanate may include a trifunctional triisocyanate having an isocyanurate structure.

The polyol may include polyester polyol.

The reactive monomer may be selected from the group consisting of 2-hydroxyethyl acrylate, 2-hydroxypropyl acrylate, 4-hydroxybutyl acrylate, 2-hydroxyethyl methacrylate, 2-hydroxypropyl methacrylate, pentaerythritol triacrylate and combinations thereof.

The first urethane-based oligomer may have a weight average molecular weight of 2,000 g/mol to 5,000 g/mol and the second urethane-based oligomer may have a weight average molecular weight of 1,000 g/mol to 4,000 g/mol.

The acrylic oligomer may include acrylic acrylate.

The acrylic oligomer may have a weight average molecular weight of 40,000 g/mol to 70,000 g/mol.

The acrylate monomer may be selected from the group consisting of tetrahydrofurfuryl acrylate, isobornyl acrylate, hydroxyl pivalic acid neopentyl glycol diacrylate and combinations thereof.

The photoinitiator may be selected from the group consisting of a short-wavelength photoinitiator including 1-hydroxy cyclohexyl phenyl ketone, a long-wavelength photoinitiator including diphenyl(2,4,6-trimethylbenzoyl) phosphine oxide (TPO) and combinations thereof.

The prepolymer may include 10 wt % to 40 wt % of a first urethane-based oligomer including a bifunctional aliphatic urethane acrylate, 5 wt % to 30 wt % of a second urethane-based oligomer including a trifunctional aliphatic urethane acrylate, and 1 wt % to 15 wt % of an acrylic oligomer, the acrylate monomer may include 10 wt % to 30 wt % of tetrahydrofurfuryl acrylate, 5 wt % to 20 wt % of isobornyl acrylate, and 1 wt % to 10 wt % of hydroxyl pivalic acid neopentyl glycol diacrylate, and the photoinitiator may include 1 wt % to 5 wt % of a short-wavelength photoinitiator and 0.5 wt % to 1 wt % of a long-wavelength photoinitiator.

The UV-curable resin composition may further include an additive selected from the group consisting of a UV stabilizer, a heat-resistant stabilizer and combinations thereof.

Another aspect of the present disclosure provides a replica film of a real material, including a substrate layer, and a resin layer, which is formed on the substrate layer and includes a first surface facing the substrate layer and a second surface opposite the first surface, the second surface having the same surface pattern as a surface pattern of the real material, and which includes the above UV-curable resin composition.

The replica film may have flexibility with a radius of curvature of 0.5 mm to 10 mm.

Still another aspect of the present disclosure provides a method of manufacturing a replica film of a real material, the method including obtaining a stack by forming a resin layer including the above UV-curable resin composition on a substrate layer, forming the same surface pattern as a surface pattern of the real material on a surface of the resin layer included in the stack, and subjecting the stack to thermoforming.

The stack may be subjected to thermoforming in a state in which the following conditions 1) to 3) are satisfied:
1) a mold temperature of higher than 130° C. to lower than 150° C.;
2) a hot-plate temperature of 140° C. to 150° C.; and
3) a pressing time of longer than 15 sec to 20 sec or less.

According to the present disclosure, a real material can be precisely replicated to afford a replica film that exhibits the inherent properties thereof.

According to the present disclosure, it is possible to obtain a replica film that can be applied to complex automotive parts that are not flat, by virtue of the high formability thereof.

According to the present disclosure, it is possible to obtain a replica film, which has the same outer appearance as real material but can be manufactured at cost of about 1/10 thereof, thus exhibiting high price competitiveness.

The effects of the present disclosure are not limited to the foregoing, and should be understood to include all effects that can be reasonably anticipated from the following description.

BRIEF DESCRIPTION OF THE FIGURES

FIG. 1 is a cross-sectional view schematically showing a replica film of a real material according to the present disclosure.

DETAILED DESCRIPTION

The above and other objectives, features and advantages of the present disclosure will be more clearly understood from the following preferred embodiments taken in conjunction with the accompanying drawings. However, the present disclosure is not limited to the embodiments disclosed herein, and may be modified into different forms. These embodiments are provided to thoroughly explain the disclosure and to sufficiently transfer the spirit of the present disclosure to those skilled in the art.

Throughout the drawings, the same reference numerals will refer to the same or like elements. For the sake of clarity of the present disclosure, the dimensions of structures are depicted as being larger than the actual sizes thereof. It will be understood that, although terms such as "first", "second", etc. may be used herein to describe various elements, these elements are not to be limited by these terms. These terms are only used to distinguish one element from another element. For instance, a "first" element discussed below could be termed a "second" element without departing from the scope of the present disclosure. Similarly, the "second" element could also be termed a "first" element. As used herein, the singular forms are intended to include the plural forms as well, unless the context clearly indicates otherwise.

It will be further understood that the terms "comprise", "include", "have", etc., when used in this specification, specify the presence of stated features, integers, steps, operations, elements, components, or combinations thereof, but do not preclude the presence or addition of one or more other features, integers, steps, operations, elements, components, or combinations thereof. Also, it will be understood that when an element such as a layer, film, area, or sheet is referred to as being "on" another element, it can be directly on the other element, or intervening elements may be present therebetween. Similarly, when an element such as a layer, film, area, or sheet is referred to as being "under" another element, it can be directly under the other element, or intervening elements may be present therebetween.

Unless otherwise specified, all numbers, values, and/or representations that express the amounts of components, reaction conditions, polymer compositions, and mixtures used herein are to be taken as approximations including various uncertainties affecting the measurements that essentially occur in obtaining these values, among others, and thus should be understood to be modified by the term "about" in all cases. Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated.

Hereinafter, a detailed description will be given of a replica film of a real material according to the present disclosure.

FIG. 1 is a cross-sectional view schematically showing a replica film 1 of a real material according to the present disclosure. With reference thereto, the replica film 1 may include a substrate layer 10, a resin layer 20, which is formed on the substrate layer 10 and includes a first surface 21 facing the substrate layer 10 and a second surface 22 opposite the first surface, and a printing layer 30 provided on the resin layer 20.

The real material may be used without particular limitation, so long as it has an inherent surface texture. Specifically, the real material may be selected from the group consisting of real carbon, real wood, natural cork, real stone, thin-film metal, Hanji and combinations thereof. Preferably useful as the real material is real carbon. According to the present disclosure, a replica film, in which the same surface pattern as the surface pattern of the real material is exposed outside, may be obtained.

The substrate layer 10 may include a transparent material, which may include, for example, but is not limited to, any material selected from the group consisting of polycarbonate (PC), polymethyl methacrylate (PMMA), polyethylene terephthalate (PET) and combinations thereof.

The substrate layer 10 may have a thickness of 0.125 mm to 0.5 mm. If the thickness thereof is less than 0.125 mm, the depth may not be sufficient to realize the replica film 1. On the other hand, if the thickness thereof exceeds 0.5 mm, formability may decrease.

The resin layer 20 may include the second surface 22 having the same surface pattern as the surface pattern of the real material. Although the surface pattern of the second surface 22 may be illustrated in the form of an irregular structure in FIG. 1, the surface pattern is not limited thereto, but should be understood to be the same as the surface pattern of the real material, which is selected depending on the end use.

The surface pattern of the second surface 22 includes recesses 22a and protrusions 22b. The recesses 22a may be depressed by a depth of 100 μm to 250 μm from the second surface 22. The criterion for measuring the depth of the recesses 22a may be the flat surface of the protrusions 22b of the second surface 22. If the thickness thereof is less than 100 μm, the three-dimensional effect may decrease. On the other hand, if the thickness thereof exceeds 250 μm, formability may decrease and concealability to the printing layer 30 may decrease.

In the surface pattern of the second surface 22, the recesses 22a and the protrusions 22b may repeatedly alternate with each other. However, the intervals therebetween may be regular or irregular. Furthermore, the recesses 22a may be depressed at or close to a right angle from the protrusions 22b, as shown in FIG. 1, or may be depressed obliquely at a predetermined angle.

The resin layer 20 includes a UV-curable resin composition. The present disclosure is characterized in that both the breaking load and elongation of the resin layer 20 are improved using the UV-curable resin composition containing specific components in predetermined amounts. Accordingly, the replica film 1 may be formed so as to have flexibility with a radius of curvature of 0.5 mm or more or 0.5 mm to 10 mm, ultimately obtaining a replica film 1 that may be applied to complex automotive parts, which will be described later.

The printing layer 30 is provided on the resin layer 20 to thus exhibit the overall color of the replica film 1, and functions to protect the resin layer 20.

The printing layer 30, without being limited thereto, may be formed by printing ink selected from the group consisting of urethane ink, polyvinyl chloride ink and combinations thereof on the resin layer 20 under conditions of a predetermined number of printing colors.

The ink may be single-component ink or two-component ink. In the case of two-component ink, a curing agent, particularly an isocyanate-based curing agent such as HDI, MDI, TDI, IPDI, etc., may be used, and the amount thereof may be 10 wt % to 20 wt % based on the total weight of the ink composition. If the amount of the curing agent is less than 10 wt %, the properties of the printing layer 30 may deteriorate, resulting in ink wash-out. On the other hand, if the amount thereof exceeds 20 wt %, printability may decrease.

In the formation of the printing layer 30, the number of printing colors is not particularly limited, but 4 or more-color printing is preferable. If the number of printing colors is less than 4, ink wash-out may occur when the replica film 1 is applied to automotive parts.

The UV-curable resin composition according to the present disclosure is specified below.

The UV-curable resin composition includes a prepolymer (A) including a urethane-based oligomer (a) and an acrylic oligomer (b), an acrylate monomer (B) and a photoinitiator (C).

The prepolymer is generally a polymer having a relatively low molecular weight, the polymerization of which is stopped at an intermediate stage so as to easily form a final shaped product. The prepolymer may be shaped alone or after reaction with another polymerizable compound, and may be prepared, for example, by reacting an isocyanate compound with a polyol.

The urethane-based oligomer (a) may contain an acrylate end group. Specifically, the urethane-based oligomer (a) may include a first urethane-based oligomer (a1) including a bifunctional aliphatic urethane acrylate and a second urethane-based oligomer (a2) including a trifunctional aliphatic urethane acrylate.

The first urethane-based oligomer (a1) is a component for improving yellowing resistance, substrate adhesion and elongation. The first urethane oligomer (a1) may be obtained by reacting a polymer of first isocyanate and polyol with a reactive monomer.

The first isocyanate may be selected from the group consisting of toluene diisocyanate (TDI), naphthalene-1,5-diisocyanate, p-phenylene diisocyanate, toluidine diisocyanate, 4,4'-diphenyl methane diisocyanate, 4,4'-methylene dicyclohexyl diisocyanate, hexamethylene diisocyanate, dicyclohexylmethane diisocyanate, isophorone diisocyanate and combinations thereof.

The polyol is not particularly limited, but may be selected from the group consisting of polyether polyol, polyester polyol, polycarbonate polyol, acryl polyol and combinations thereof, and preferably includes polyester polyol.

The reactive monomer functions as a crosslinkable monomer so that free radicals generated by the photoinitiator cross-polymerize the double bonds in the reactive monomer to each other to thus perform curing. The reactive monomer may be selected from the group consisting of 2-hydroxyethyl acrylate, 2-hydroxypropyl acrylate, 4-hydroxybutyl acrylate, 2-hydroxyethyl methacrylate, 2-hydroxypropyl methacrylate, pentaerythritol triacrylate and combinations thereof.

The first urethane-based oligomer (a1) may have a weight average molecular weight of 2,000 g/mol to 5,000 g/mol, particularly 3,000 g/mol to 4,000 g/mol.

The first urethane-based oligomer (a1) is obtained by reacting, for example, a polymer of a first isocyanate, namely 4,4'-methylene dicyclohexyl diisocyanate, and a polyester polyol with 2-hydroxyethyl acrylate as the reactive monomer, and may have a weight average molecular weight of 3,000 g/mol.

The amount of the first urethane-based oligomer (a1) may be 10 wt % to 40 wt % based on the total weight of the UV-curable resin composition. If the amount thereof is less than 10 wt %, the elongation of the resin layer and the adhesion thereof to the substrate may decrease. On the other hand, if the amount thereof exceeds 40 wt %, insufficient curability may result, releasability may decrease and coating performance may decrease with an increase in viscosity.

The second urethane-based oligomer (a2) is a component for improving curability and reinforcing elongation and breaking load. The second urethane oligomer (a2) may be obtained by reacting a polymer of second isocyanate and polyol with a reactive monomer.

The second isocyanate may include trifunctional triisocyanate having an isocyanurate structure. For example, the second isocyanate may be selected from the group consisting of (2,4,6-trioxotriazine-1,3,5(2H,4H,6H)-triyl)tris(hexamethylene) isocyanate and combinations thereof.

The polyol is not particularly limited, but may be selected from the group consisting of, for example, polyether polyol, polyester polyol, polycarbonate polyol, acryl polyol and combinations thereof, and is preferably polyester polyol. The polyol may be the same as or different from the polyol of the first urethane-based oligomer (a1).

The reactive monomer functions as a crosslinkable monomer so that free radicals generated by the photoinitiator cross-polymerize the double bonds in the reactive monomer to each other to thus perform curing. The reactive monomer may be selected from the group consisting of 2-hydroxyethyl acrylate, 2-hydroxypropyl acrylate, 4-hydroxybutyl acrylate, 2-hydroxyethyl methacrylate, 2-hydroxypropyl methacrylate, pentaerythritol triacrylate and combinations thereof. The reactive monomer may be the same as or different from the reactive monomer of the first urethane-based oligomer (a1).

The second urethane-based oligomer (a2) may have a weight average molecular weight of 1,000 g/mol to 4,000 g/mol, particularly 2,000 g/mol to 3,000 g/mol.

The second urethane-based oligomer (a2) is obtained by reacting a polymer of a second isocyanate, namely (2,4,6-trioxotriazine-1,3,5(2H,4H,6H)-triyl)tris(hexamethylene) isocyanate, and a polyester polyol with pentaerythritol triacrylate as the reactive monomer, and may have a weight average molecular weight of 2,000 g/mol.

The amount of the second urethane-based oligomer (a2) may be 5 wt % to 30 wt % based on the total weight of the UV-curable resin composition. If the amount thereof is less than 5 wt %, the curability and releasability of the resin layer may decrease. On the other hand, if the amount thereof exceeds 30 wt %, elongation may decrease.

The acrylic oligomer (b) is a component for enhancing adhesion of the substrate. The acrylic oligomer (b) may include acrylic acrylate.

The acrylic oligomer (b) may have a weight average molecular weight of 40,000 g/mol to 70,000 g/mol, particularly 50,000 g/mol to 60,000 g/mol.

The amount of the acrylic oligomer (b) may be 1 wt % to 15 wt % based on the total weight of the UV-curable resin composition. If the amount thereof is less than 1 wt %, the effect of addition of the acrylic oligomer (b) may become insignificant. On the other hand, if the amount thereof exceeds 15 wt %, the viscosity may increase and thus coating performance may deteriorate.

The acrylate monomer (B) is a component for improving the properties of the resin layer, and functions such that free radicals generated by the photoinitiator cross-polymerize the double bonds in the acrylate monomer to each other to thus perform curing.

The acrylate monomer (B) may be selected from the group consisting of tetrahydrofurfuryl acrylate, isobornyl acrylate, hydroxyl pivalic acid neopentyl glycol diacrylate and combinations thereof, and preferably includes tetrahydrofurfuryl acrylate, isobornyl acrylate and hydroxyl pivalic acid neopentyl glycol diacrylate.

Specifically, the acrylate monomer (B) may include, based on the total weight of the UV-curable resin composition, 10 wt % to 30 wt % of tetrahydrofurfuryl acrylate, 5 wt % to 20 wt % of isobornyl acrylate and 1 wt % to 10 wt % of hydroxyl pivalic acid neopentyl glycol diacrylate.

If the amount of tetrahydrofurfuryl acrylate is less than 10 wt %, insufficient dilution ability may result and substrate adhesion may decrease. On the other hand, if the amount thereof exceeds 30 wt %, curability may decrease and thus unreacted materials may remain.

If the amount of isobornyl acrylate is less than 5 wt %, substrate adhesion may decrease and poor chemical resistance may result. On the other hand, if the amount thereof exceeds 20 wt %, curability may decrease and thus unreacted materials may remain.

If the amount of hydroxyl pivalic acid neopentyl glycol diacrylate exceeds 10 wt %, elongation may decrease.

The photoinitiator (C) absorbs ultraviolet light and photolyzes to generate free radicals. The free radicals cross-polymerize the double bonds of the prepolymer, acrylate monomer and the like to each other to thus perform curing.

The photoinitiator (C) may be selected from the group consisting of a short-wavelength photoinitiator, a long-wavelength photoinitiator and combinations thereof, and preferably a short-wavelength photoinitiator and a long-wavelength photoinitiator are used together.

The short-wavelength photoinitiator may include 1-hydroxy cyclohexyl phenyl ketone, etc.

The amount of the short-wavelength photoinitiator may be 1 wt % to 5 wt % based on the total weight of the UV-curable resin composition. If the amount thereof is less than 1 wt %, no surface curing may occur. On the other hand, if the amount thereof exceeds 5 wt %, excessive curing may occur.

The long-wavelength photoinitiator may include diphenyl (2,4,6-trimethylbenzoyl)phosphine oxide (TPO), etc.

The amount of the long-wavelength photoinitiator may be 0.5 wt % to 1 wt % based on the total weight of the UV-curable resin composition. If the amount thereof is less than 0.5 wt %, insufficient curing may occur. On the other hand, if the amount thereof exceeds 1 wt %, yellowing may occur.

The UV-curable resin composition may further include an additive selected from the group consisting of a UV stabilizer, a heat-resistant stabilizer, a dispersant, a matting agent, a defoamer and combinations thereof.

A method of manufacturing a replica film of a real material using the UV-curable resin composition is specified below.

The method of manufacturing a replica film of a real material may include obtaining a stack by forming a resin layer including the UV-curable resin composition on a substrate layer, forming the same surface pattern as the surface pattern of the real material on the second surface of the resin layer, and subjecting the stack to thermoforming.

The forming the surface pattern is not particularly limited, and may include, for example, an imprinting process.

After the formation of the surface pattern, curing the resin layer with UV light may be further performed.

The thermoforming may be carried out using a typical thermoforming device including a mold having a desired shape, a hot plate capable of transferring heat to the stack, and the like. Here, the thermoforming is preferably conducted in a state in which the following conditions 1) to 3) are satisfied:

1) a mold temperature of higher than 130° C. to lower than 150° C.

2) a hot-plate temperature of 140° C. to 150° C.

3) a pressing time of longer than 15 sec to 20 sec or less.

When using the above-described UV-curable resin composition under the above thermoforming conditions, it is possible to prevent the wrinkling of the resin layer and the stack may be flexible, with a radius of curvature of 0.5 mm or more or 0.5 mm to 10 mm.

A better understanding of the present disclosure will be given through the following examples. However, these examples are merely set forth to illustrate the present disclosure, but are not to be construed as limiting the scope of the present disclosure.

Example 1 and Comparative Examples 1 and 2

Respective UV-curable resin compositions were prepared using the prepolymers shown in Table 1 below, followed by UV imprinting to form resin layers. The prepolymer of Example 1 was composed of a urethane-based oligomer and an acrylic oligomer, the prepolymer of Comparative Example 1 was composed of a urethane-based oligomer and bisphenol A, and the prepolymer of Comparative Example 2 was composed exclusively of a urethane-based oligomer.

Here, all of the acrylate monomer, photoinitiator, additive and the like, as the remaining components, were set to the same kinds and amounts.

TABLE 1

|  |  | No. | | |
|---|---|---|---|---|
|  |  | Example 1 | Comparative Example 1 | Comparative Example 2 |
|  |  | Kind of prepolymer | | |
|  |  | Urethane + acryl | Urethane + bisphenol A | Urethane |
| Productivity (Workability) | Viscosity | O | Δ | X |
|  | Releasability | O | O | X |
|  | Curability | O | O | O |
| Basic properties | Initial outer appearance | O | O | O |
|  | Initial adhesion | O | X | X |
|  | Adhesion after aging | O | X | X |
|  | Yellowing after aging | O | O | O |

The viscosity was measured under conditions of 60 rpm, 25° C. and 30 sec using a viscometer, and a viscosity of 300 cps or less was evaluated to be good (O). The releasability was measured on a test sample having a size of 25.4 mm×200 mm at a peeling rate of 900 mm/min and a measurement zone of 150 mm using a peel strength tester, and the case in which no residue was observed with the naked eye was evaluated to be good (O).

The curability was determined by measuring the extent of curing of the resin layer, and the level that enables shaping so as to have flexibility of 0.5 mm was evaluated to be good (O).

The adhesion and yellowing after aging were determined by measuring the adhesion and yellowing of the test sample after tests for light resistance, heat resistance, high-temperature humidity resistance and hot water immersion resistance.

As is apparent from Table 1, Comparative Example 1 showed slightly high viscosity and poor adhesion and Comparative Example 2 showed poor viscosity, reliability and adhesion.

It can be concluded that, when using the prepolymer according to the present disclosure composed of the urethane-based oligomer and the acrylic oligomer, productivity, outer appearance, and adhesion were superior and no yellowing occurred.

Examples 2 to 5

Respective UV-curable resin compositions were prepared using components in the amounts shown in Table 2 below, followed by UV imprinting to form resin layers. For reference, the numeric values of Table 2 are represented as wt %.

TABLE 2

| Composition | Example 2 | Example 3 | Example 4 | Example 5 |
|---|---|---|---|---|
| First urethane-based oligomer[1] | 24~33 | 27~37 | 21~31 | 15~25 |
| Second urethane-based oligomer[2] | 5~15 | 5~15 | 4~11 | 10~20 |
| Acrylic oligomer[3] | 1~5 | 1~5 | 5~15 | 10~20 |
| Tetrahydrofurfuryl acrylate | 18~28 | 17~27 | 17~27 | 15~25 |
| Isobornyl acrylate | 14~24 | 13~23 | 13~23 | 12~22 |
| Hydroxyl pivalic acid neopentyl glycol diacrylate | 6~16 | 5~15 | 5~15 | 3~13 |
| Short-wavelength initiator[4] | <3 | <3 | <3 | <3 |

TABLE 2-continued

| Composition | Example 2 | Example 3 | Example 4 | Example 5 |
|---|---|---|---|---|
| Long-wavelength initiator[5] | <1 | <1 | <1 | <1 |
| UV stabilizer[6] | <1 | <1 | <1 | <1 |
| Heat-resistant stabilizer[7] | <1 | <1 | <1 | <1 |

[1]A first urethane-based oligomer obtained by reacting a polymer of 4,4'-methylene dicyclohexyl diisocyanate and polyester polyol with 2-hydroxyethyl acrylate was used, and the weight average molecular weight thereof was about 3,000 g/mol.
[2]A second urethane-based oligomer obtained by reacting a polymer of (2,4,6-trioxotri-azine-1,3,5(2H,4H,6H)-triyl)tris(hexamethylene) isocyanate and polyester polyol with pentaerythritol triacrylate was used, and the weight average molecular weight thereof was about 2,000 g/mol.
[3]Acrylic acrylate having a weight average molecular weight of about 50,000 g/mol was used.
[4]1-Hydroxy cyclohexyl phenyl ketone
[5]Diphenyl(2,4,6-trimethylbenzoyl)phosphine oxide
[6]Irganox ® 1010
[7]TINUVIN ® 292

The resin layers of Examples 2 to 5 were measured for elongation, breaking load, releasability and viscosity. The releasability and viscosity were measured as above. The elongation and breaking load were measured in accordance with ASTM D 882, and specifically, a test sample having a size of 15 mm×125 mm was evaluated at 130° C. at a rate of 200 mm/min. The results are shown in Table 3 below.

TABLE 3

| Items | Example 2 | Example 3 | Example 4 | Example 5 |
|---|---|---|---|---|
| Elongation [%] (criterion: 40% or more) | 72.4 | 68.9 | 99.2 | 103.1 |
| Breaking load [kgf] | 0.158 | 0.156 | 0.2 | 0.193 |
| Releasability [gf] | 175 | 177 | 158 | 149 |
| Viscosity [cps] (criterion: 300 cps or less) | 160.8 | 206 | 241.3 | 250.4 |

As is apparent from Table 3, the elongation, breaking load, releasability and viscosity of the resin layers of Examples 2 to 5 satisfied the criteria and were thus evaluated to be good. In particular, both breaking load and elongation of the resin layer of Example 5 were greatly increased.

Example 6 and Comparative Examples 3 to 10

A stack was prepared by forming a resin layer on a substrate layer using the UV-curable resin composition of Example 5, followed by thermoforming under the conditions of Table 4 below. The results thereof were evaluated.

In order to evaluate the flexibility of the stack, the stack was shaped using molds having various curvatures. Specifically, molds having radii of curvature of 0.5R, 0.75R, 1R, 1.25R, and 1.3R were used. The results thereof are shown in Table 4 below.

TABLE 4

| No. | Mold temperature [° C.] | Hot plate temperature [° C.] | Hot plate time [sec] | Shaping results |
|---|---|---|---|---|
| Comparative Example 3 | 130 | Without use of hot plate | Without use of hot plate | Wrinkled in depth direction |
| Comparative Example 4 | 150 |  | 10 | Wrinkled in depth direction |

TABLE 4-continued

| No. | Mold temperature [° C.] | Hot plate temperature [° C.] | Hot plate time [sec] | Shaping results |
|---|---|---|---|---|
| Comparative Example 5 | | 180 | 10 | Wrinkled in depth direction |
| Comparative Example 6 | | 180 | 15 | Not shaped at 1.25 R or less |
| Comparative Example 7 | | 180 | 20 | Wrinkled in depth direction |
| Comparative Example 8 | 150 | Without use of hot plate | Without use of hot plate | Wrinkled in depth direction |
| Comparative Example 9 | | 150 | 20 | Not shaped at 0.5 R or less, Change of shape when demolding due to excessive mold temperature |
| Comparative Example 10 | 140 | 150 | 30 | Excessive film deformation before pressing |
| Example 6 | | 150 | 20 | Shapeable at 0.5 R or more |

As is apparent from Table 4, when thermoforming was carried out using the UV-curable resin composition of the present disclosure under the conditions of a mold temperature of higher than 130° C. to lower than 150° C., a hot-plate temperature of 140° C. to 150° C. and a pressing time of longer than 15 sec to 20 sec or less, the resulting film had no wrinkles and exhibited flexibility with a radius of curvature of 0.5 mm or more.

The scope of the present disclosure as described above in connection with the test examples and examples of the present disclosure is not limited to the test examples and examples. Various modifications and improvements by those skilled in the art using the basic concepts of the present disclosure as defined in the following claims are also included in the scope of the present disclosure.

The invention claimed is:

1. A UV-curable resin composition, comprising:
    a prepolymer including a urethane-based oligomer and an acrylic oligomer;
    an acrylate monomer; and
    a photoinitiator;
    wherein the prepolymer comprises 10 wt % to 40 wt % of a first urethane-based oligomer including a bifunctional aliphatic urethane acrylate, 5 wt % to 30 wt % of a second urethane-based oligomer including a trifunctional aliphatic urethane acrylate, and 1 wt % to 15 wt % of an acrylic oligomer;
    wherein the acrylate monomer comprises 10 wt % to 30 wt % of tetrahydrofurfuryl acrylate, 5 wt % to 20 wt % of isobornyl acrylate, and 1 wt % to 10 wt % of hydroxyl pivalic acid neopentyl glycol diacrylate; and
    wherein the photoinitiator comprises 1 wt % to 5 wt % of a short-wavelength photoinitiator and 0.5 wt % to 1 wt % of a long-wavelength photoinitiator;
    wherein the wt % is based on a total weight of the UV-curable resin composition.

2. The UV-curable resin composition of claim 1, wherein the urethane-based oligomer and the acrylic oligomer contain an acrylate end group.

3. The UV-curable resin composition of claim 1, wherein the urethane-based oligomer includes:
    a first urethane-based oligomer obtained by reacting a polymer of a first isocyanate and a polyol with a reactive monomer; and
    a second urethane-based oligomer obtained by reacting a polymer of a second isocyanate and a polyol with a reactive monomer.

4. The UV-curable resin composition of claim 3, wherein the first isocyanate is selected from the group consisting of toluene diisocyanate (TDI), naphthalene-1,5-diisocyanate, p-phenylene diisocyanate, toluidine diisocyanate, 4,4'-diphenyl methane diisocyanate, 4,4'-methylene dicyclohexyl diisocyanate, hexamethylene diisocyanate, dicyclohexylmethane diisocyanate, isophorone diisocyanate and combinations thereof.

5. The UV-curable resin composition of claim 3, wherein the second isocyanate includes a trifunctional triisocyanate having an isocyanurate structure.

6. The UV-curable resin composition of claim 3, wherein the polyol of each of the first urethane-based oligomer and the second urethane-based oligomer includes polyester polyol.

7. The UV-curable resin composition of claim 3, wherein the reactive monomer of each of the first urethane-based oligomer and the second urethane-based oligomer is selected from the group consisting of 2-hydroxyethyl acrylate, 2-hydroxypropyl acrylate, 4-hydroxybutyl acrylate, 2-hydroxyethyl methacrylate, 2-hydroxypropyl methacrylate, pentaerythritol triacrylate and combinations thereof.

8. The UV-curable resin composition of claim 3, wherein the first urethane-based oligomer has a weight average molecular weight of 2,000 g/mol to 5,000 g/mol and the second urethane-based oligomer has a weight average molecular weight of 1,000 g/mol to 4,000 g/mol.

9. The UV-curable resin composition of claim 1, wherein the acrylic oligomer includes acrylic acrylate.

10. The UV-curable resin composition of claim 1, wherein the acrylic oligomer has a weight average molecular weight of 40,000 g/mol to 70,000 g/mol.

11. The UV-curable resin composition of claim 1, further comprising an additive selected from the group consisting of a UV stabilizer, a heat-resistant stabilizer and combinations thereof.

12. A replica film of a real material, comprising:
    a substrate layer; and
    a resin layer formed on the substrate layer and including a first surface facing the substrate layer and a second surface opposite the first surface, the second surface having the same surface pattern as a surface pattern of the real material, and
    wherein the resin layer includes the UV-curable resin composition of claim 1.

13. The replica film of claim 12 having flexibility with a radius of curvature of 0.5 mm to 10 mm.

14. A method of manufacturing a replica film of a real material, the method comprising:
    obtaining a stack by forming a resin layer including the UV-curable resin composition of claim 1 on a substrate layer;
    forming the same surface pattern as a surface pattern of the real material on a surface of the resin layer included in the stack; and
    subjecting the stack to thermoforming.

15. The method of claim 14, wherein the stack is subjected to thermoforming in a state in which the following conditions 1) to 3) are satisfied:
    1) A mold temperature of higher than 130° C. to lower than 150° C.;
    2) A hot-plate temperature of 140° C. to 150° C.; and
    3) a pressing time of longer than 15 sec to 20 sec or less.

16. The method of claim 15, wherein the replica film has flexibility with a radius of curvature of 0.5 mm to 10 mm.

* * * * *